Figure 1:
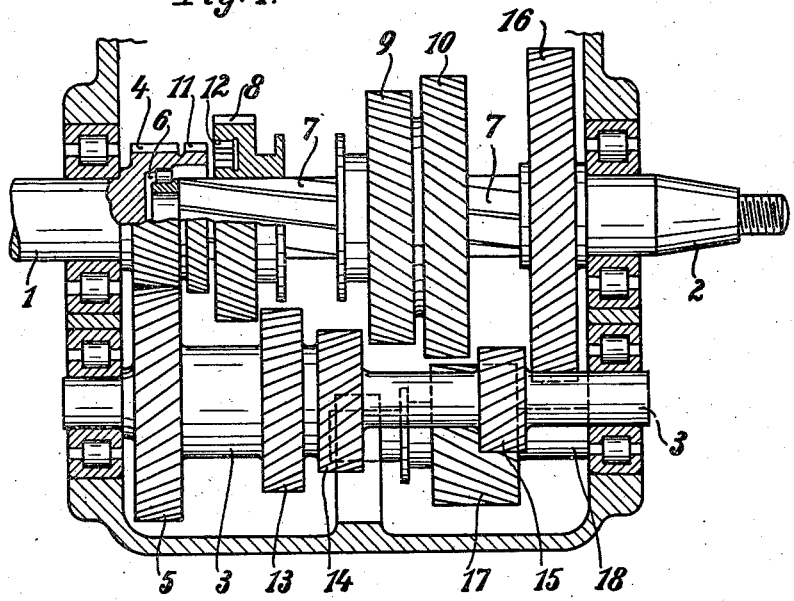

Nov. 5, 1935.  H. MOLLY  2,019,923

CHANGE SPEED GEARING

Filed March 16, 1932

Inventor:

Patented Nov. 5, 1935

2,019,923

UNITED STATES PATENT OFFICE 2,019,923

CHANGE SPEED GEARING

Hans Molly, Friedrichshafen, Germany, assignors, by mesne assignments, to Chrysler Corporation, Detroit, Mich., a corporation of Delaware Application March 16, 1932, Serial No. 599,208
In Germany April 4, 1931

1 Claim. (Cl. 74—343)

My invention relates to change speed gears, especially in motor vehicles, and has special reference to gears of this kind in which the gear wheels have inclined or helical teeth.

As is well known the use of inclined or helical teeth has the advantage of reducing the noise so that the gears run practically noiseless. If such gear wheels have to be shifted to come into engagement with their corresponding wheels it is advantageous to provide for a helical shift movement for the gears. This is done by making the usual feathers on the shaft on which the gear wheels are shifted helical with their helices in the same direction of those of the gear teeth and having approximately the same gradient.

If this special way of construction is applied to four speed gears there arises a difficulty with regard to the reverse speed, as the usual gears for this purpose cannot be brought into engagement because of their different directions in the inclination of their teeth. This difficulty is overcome according to my invention by adding to the usual gears another gear on one of the shafts, driving, driven or countershaft (according as conditions may prevail), and giving this gear an inclination of its teeth which is oppositely directed to that of the other wheels on the same shaft.

This will be understood best by having reference to the drawing which represents examples embodying my invention.

The figures are vertical sections through the gear cases. In Fig. 1 the additional gear is on one of the main shafts, whereas in Fig. 2 this gear is situated on the countershaft.

In both figures the driving shaft is indicated at 1, and the driven shaft at 2. Countershaft 3 is situated underneath the main shafts.

There is a gear 4 rigidly fixed to shaft 1 and in constant mesh with gear 5 fixed on the countershaft 3. Shaft 2 with its end is journaled within a recess 6 of shaft 1. It is provided with helical feathers or splines 7 on which gears 8, 9 and 10 are adapted to slide. The means for shifting these gears may be of any well known construction and are not shown in the drawing. Instead of providing feathers on the driven shaft other well known means may be provided which allow for splining gears to this shaft, but they should be so that the gears are moved on a helical way around the shaft, so as to allow for easy engagement of the gears with regard to their inclined teeth.

Gear 8 by means of helical clutch teeth 11 and 12 can be coupled to shaft 1 thus causing coupling of shafts 1 and 2 for direct drive. When shifted in the opposite direction gear 8 gets into engagement with gear 13 on the countershaft, thus causing the third speed.

Gears 9 and 10 are adapted to be shifted together. In their left hand position gear 9 meshes with gear 14 (second speed), and in their right hand position gear 10 is in engagement with gear 15 (first speed).

In the example shown in Fig. 1 there is an additional gear 16 fixed to shaft 2 and having teeth inclined in the opposite direction to the inclination of the teeth of gears 8, 9 and 10. This gear 16 is adapted to engage with gear 17 fixed to reversing shaft 18 when gear 17 is shifted to the right. At the same time gear 17 meshes with gear 15 and thus the reverse speed is attained.

Figure 2:
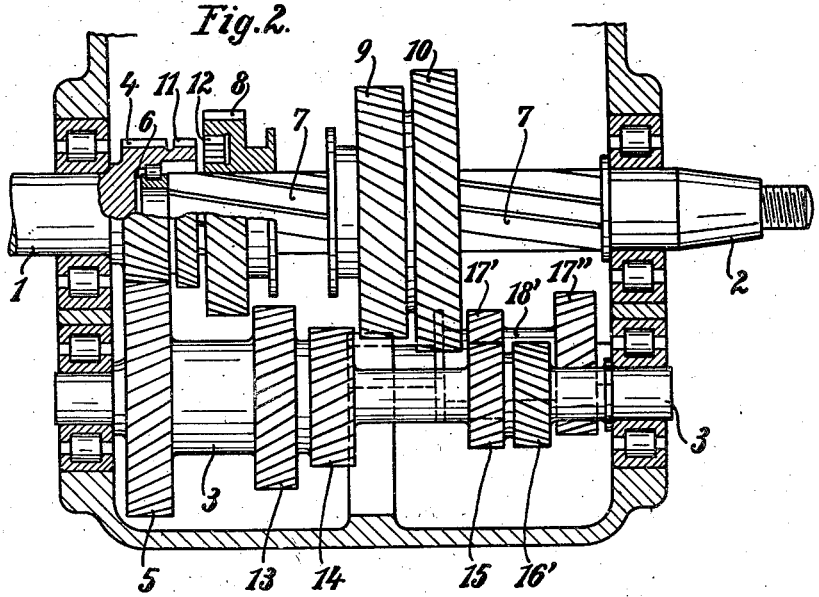

In the second example shown in Fig. 2 the additional gear 16' is fixed to the countershaft 3. In this case the inclination of its teeth is opposite to that of teeth 13, 14 and 15. Instead of one reversing gear two are used, but both are made of one piece; if these two gears are shifted to the left gear 17' meshes with gear 10 and gear 17'' with gear 16'.

I do not want to be limited to the details described or shown in the drawing, as variations will be apparent to those skilled in the art.

What I claim is:

In a transmission of the selective gear type, a driven shaft, a countershaft, a driving shaft axially aligned with said driven shaft and drivingly connected to said countershaft, a plurality of forwardly driving gears each having teeth similarly inclined and being mounted on and fixed to said countershaft against axial movement relatively thereto, a plurality of forwardly driving gears each having teeth similarly inclined and being mounted on said driven shaft, said countershaft gears being adapted to selectively drive said driven shaft in its normal forward direction through the intermediary of said driven shaft gears, said driven shaft alone being formed with a helically splined portion thereof adapted to rotatably and axially guide at least one of said plurality of forwardly driving gears mounted thereon for meshing with one of said plurality of forwardly driving countershaft gears, a reversing gear fixed against axial movement on said countershaft and having its teeth inclined oppositely from the said inclination of said plurality of forwardly driving countershaft gears, said reversing gear being inactive as a driving intermediary for all drives imparted to said driven shaft in its said normal forward direction, means including at least one additional reversing gear for providing a manually controlled reversing gear train for driving said driven shaft from said countershaft in a direction reversed from said normal forward direction, said reversing gear train means also including said fixed countershaft reversing gear and one of said forwardly driving gears on said driven shaft.

HANS MOLLY.